3 Sheets--Sheet 1.
W. R. WATSON & R. A. ROBERTSON.
Apparatus for Filtering Saccharine Solutions.
No. 165,637. Patented July 13, 1875.
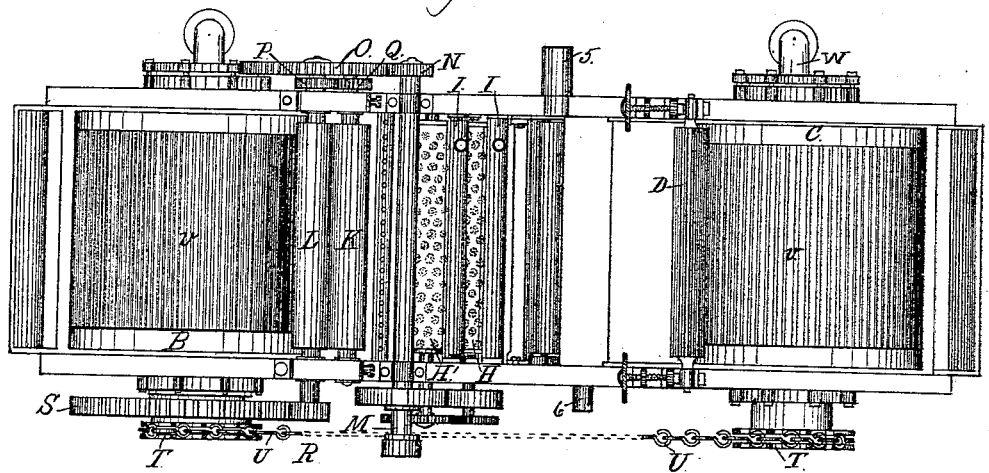
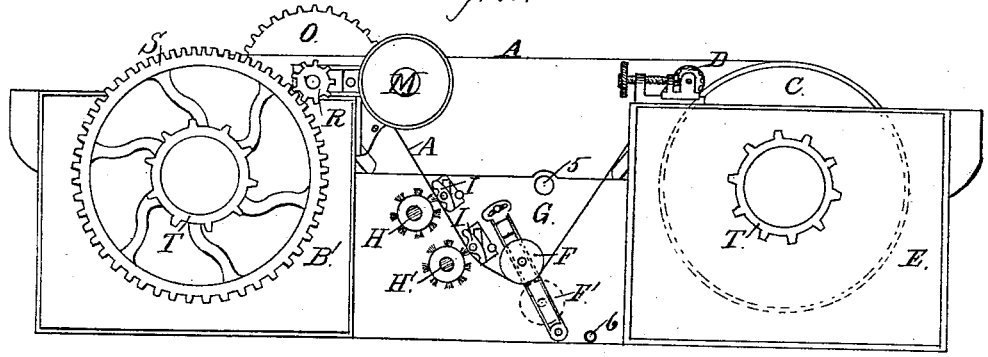
WITNESSES
Geo. T. Smallwood Jr.
John Robey Jr.
William Penny Watson.
Robert Andrew Robertson.
INVENTORS.
By John J. Halsted
Atty.

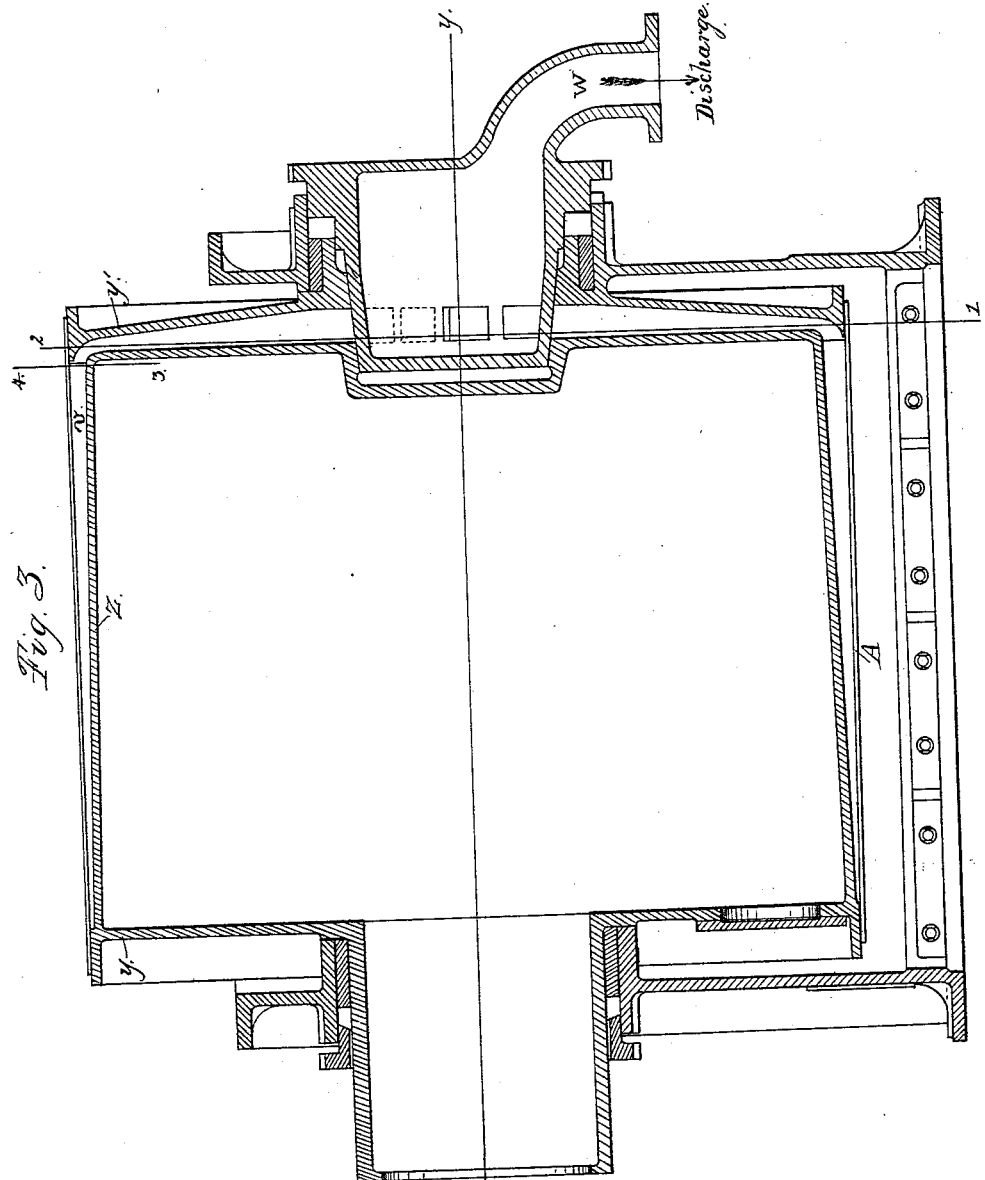

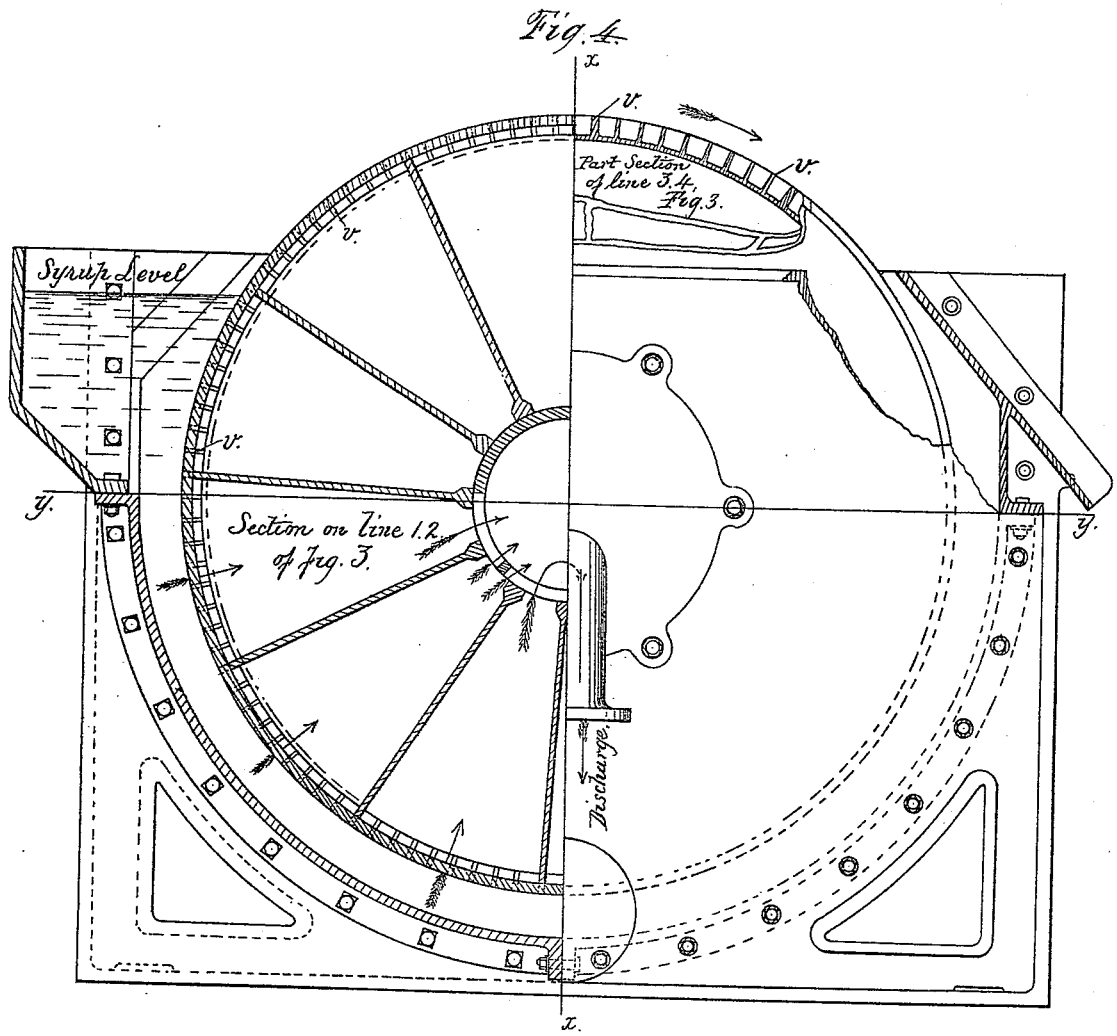

UNITED STATES PATENT OFFICE.

WILLIAM R. WATSON AND ROBERT A. ROBERTSON, OF GLASGOW, SCOTLAND.

IMPROVEMENT IN APPARATUS FOR FILTERING SACCHARINE SOLUTIONS.

Specification forming part of Letters Patent No. 165,637, dated July 13, 1875; application filed June 4, 1875.

*To all whom it may concern:*

Be it known that we, WILLIAM RENNY WATSON and ROBERT ANDREW ROBERTSON, both of Glasgow, county of Lanark, Scotland, Great Britain, have invented Improvements in Apparatus for Filtering Saccharine Solutions and other Liquids; and we do hereby declare that the following, taken in connection with the drawings which accompany and form part of this specification, is a description of our invention sufficient to enable those skilled in the art to practice it.

Our invention, a part of which is shown in our English Patent No. 974 for 1873, relates to the filtration of liquids, and is especially adapted for filtering saccharine solutions; and it consists in improvements in that class of apparatus in which the liquid is filtered through cloth or textile fabrics, the most important feature being that the filter has a continuous action, the cloth passing from the revolving working or filtering drum to another revolving drum, on which, or on the way to which, it is acted upon and cleaned, the second drum serving to draw water through the cloth to wash it. Under this invention the endless cloth or other fabric is passed over guide-pulleys onto the periphery of a hollow drum revolving continuously, or intermittently when preferred, in a tank containing the liquid to be filtered. A portion of the circumference of the drum is situated below the surface of the liquid, which is caused to filter through the cloth to the periphery of the drum, where it is received between longitudinal ribs, and between which it runs along to one end of the drum, and thence passes to its interior or to its central part by the pressure due to the head of liquid alone, or by the addition of atmospheric pressure induced by exhausting, or partly exhausting, the air from that space around or within the drum, which is beneath the filter-cloth by means of an air-pump or other exhausting apparatus communicating therewith through the journal of the drum, and through which journal the filtered liquid is delivered into a suitable receptacle. The cloth or other fabric, after having passed through the liquid contained in the tank, may be delivered direct from the drum onto a reel, or its equivalent, and thence removed for the purpose of washing from it the dirt filtered from the liquid preparatory to its again passing around the filtering-drum; or previous to such washing, when the substance in the solution being filtered is valuable, as in the case of saccharine solutions, the cloth may be conducted through apparatus by which the sugar or other substance contained in the liquid saturating both the cloth and the dirt filtered from the liquid may be recovered, and which apparatus, as also that for washing the dirt from the cloth, may either constitute separate machines or be attached to the filter, thereby rendering the process continuous.

In the drawings, Figure 1 is a plan; Fig. 2, an elevation, partly in section, of an apparatus serving to illustrate our invention; Fig. 3, a vertical section through the axis of one of the drums; and Fig. 4, an elevation of a drum, the left half of the figure being in section through the line 1 2 of Fig. 3, and the right half of the figure having a portion in section through the line 3 4 of Fig. 3.

As shown by the drawings, which represent an apparatus with an endless filtering-cloth for continuous action, this cloth or fabric A is passed from the filtering drum or cylinder B, which is partially immersed in a tank, B', to and around the washing drum or cylinder C, also partially immersed in a water tank or cylinder, and on its route the cloth passes to and over an adjusting-roller, D, mounted on this water-tank E; thence down and under a tightening-roller, F, or between two such rollers, F F', located in a washing-tank, G; thence upward, and with its outer side in contact with the periphery of one or more revolving brushes, H H', which have water-jets adapted to cleanse the cloth, these jets discharging from openings in tubes I, supplied with water from any convenient source, the cloth passing between the jets and the brushes; thence the cloth passes, if preferred, over a stretching-bar having similar water-jets; thence to and between squeezing-rollers K L, operated from the main driving-shaft M, driven by power from any convenient source, this shaft being preferably provided with fast and loose pulleys, (not necessary to be shown,) whereby the device may be driven or stopped, as occasion may require. The shaft M imparts motion by means of pinion N to the large gear O on the shaft of roller L, and a small pinion, P, on this latter shaft gears with a pinion, Q, on the shaft of the squeezing-roller K. A pinion, R, on the opposite end of the shaft of roller L engages with the large gear s, which gives motion to the drum B. The drums B and C are connected by sprocket-wheels T and chain U, or equivalent means, so that the revolution of one shall impart motion to the other. A portion of the circumference of each drum is below the surface of the liquid, which is caused to filter through the endless cloth, and then to run between longitudinal ribs v on the periphery of the drum to one end of the same, and thence to its interior, or to a journal-outlet or sweet-water discharge, W, any appropriate air-pumps or other exhausting apparatus being employed, if desired, to assist the filtering through the cloth. These drums, each of which may either be cast in one piece or built up in several pieces, as preferred, are formed, as shown by accompanying drawings, with two flanged ends, y y', of equal diameter, each provided with a hollow journal, on which the drum revolves, and the two ends are connected together by a cylinder, z, having a diameter slightly larger at one end than at the other, as seen in Fig. 3. On the surface of the cylinder joining the ends are cast the ribs v, (see Figs. 3 and 4,) parallel with the axis of the drum, and which serve to support the filtering cloth or surface, and also form channels to convey the filtered liquor to one end of the drum, and it is to facilitate the flow of the liquor while reducing the vacant space below the filtering material or cloth that the cylindrical part of the drum is made larger in diameter at one end than at the other. One end of the drum is provided with ports connecting the channels between the ribs on the periphery of the drum with the hollow journal, where provision is made for the discharge of the filtered liquor, and for the withdrawal of the air either from the whole interior of the drum or from such parts as desired.

It will thus be seen that by this construction the air-space to be exhausted, instead of being the entire space within the drums, is very greatly reduced, being merely that upon its exterior.

In some cases, however, we perforate the periphery of the drum, and filter through these perforations to its interior, and discharge through the journal, as shown in our English Specification No. 974 for 1873; but in such cases all the air-space within the air-drum would have to be exhausted, instead of only the reduced space shown in the accompanying drawings.

The overflow from the washing-tank G is shown at 5, and 6 is an outlet for emptying this tank when desired. The filtering-drums may be revolved intermittently, the fast and loose pulleys or other well-known means being used for this purpose.

The brushes and their water-jets serve to cleanse the cloth after it has passed over the washing-drum C, and to remove from it the grosser part of the sediment filtered from the liquor. This supersedes the necessity of removing the cloth for that purpose.

If desired, however, the cloth, instead of being endless, may unwind from a roller as it passes to the drum B, and be wound on another roller after it leaves the drum. It can then be removed to be washed, similar rollers with a similar cloth being all ready to be substituted in their places, so that the operation may go on continuously.

The filtering-belt may be either a textile fabric, or felt, paper, or other suitable material. The speed of the filtering and washing drums and the depth of liquor and of water in the respective tanks may be adjusted to correspond with the character of the liquor to be filtered. The washing-drum may be exhausted or not, as circumstances may require.

We claim—

1. As a means for effecting the continuous filtration of liquids or solutions, the combination of the revolving filtering-drum and its tank, the revolving washing-drum C and its water-tank, and the filtering-cloth A, passing from one drum and tank to the other, substantially as shown and described.

2. The revolving filtering-drum, constructed with heads and a non-perforated periphery, with its air-space restricted to its periphery and end, and operating substantially as set forth.

WILLIAM RENNY WATSON.
ROBERT ANDREW ROBERTSON.

Witnesses:
DANIEL STEWART,
JAMES BARCLAY.